United States Patent

[11] 3,589,191

| [72] | Inventor | Alfred H. Kelch, Jr.<br>Mequon, Wis. |
|---|---|---|
| [21] | Appl. No. | 865,892 |
| [22] | Filed | Oct. 13, 1969 |
| [45] | Patented | June 29, 1971 |
| [73] | Assignee | The Kelch Corp.<br>Mequon, Wis. |

[54] LIQUID LEVEL INDICATORS
4 Claims, 5 Drawing Figs.

[52] U.S. Cl................................................... 73/327
[51] Int. Cl...................................................... G01f 23/02
[50] Field of Search............................................ 73/327, 334; 116/118

[56] References Cited
UNITED STATES PATENTS

| 1,724,718 | 8/1929 | Kryzanowsky | 73/327 X |
| 2,123,479 | 7/1938 | Spencer | 73/327 |
| 2,554,557 | 5/1951 | Brown et al. | 73/327 |
| 3,273,267 | 9/1966 | Willman | 73/327 |
| 3,335,607 | 8/1967 | Seekins | 73/334 |
| 3,339,519 | 9/1967 | Taylor et al. | 116/118 |
| 3,442,127 | 5/1969 | Nichols | 73/327 |

FOREIGN PATENTS

| 694,125 | 7/1953 | Great Britain | 73/327 |

Primary Examiner—Louis R. Prince
Assistant Examiner—Daniel M. Yasich
Attorney—Morsell and Morsell ABSTRACT: A reflective gauge device including a transparent, spirallike depending blade member provided with a plurality of stepped, downwardly facing, prismatic facet elements, said blade extending downwardly into a liquid container and being so designed that light is not reflected through the facets on that portion of the blade which is immersed in the liquid, there being a calibrated, circular scale in the top of said device whereby the light reflected through the facet element located immediately above the surface of the liquid provides a visual indication on said scale of the volume of liquid present in the container.

PATENTED JUN 29 1971

3,589,191

INVENTOR
ALFRED H. KELCH, JR.

BY

*Morsell & Morsell*

ATTORNEYS

LIQUID LEVEL INDICATORS

BACKGROUND OF THE INVENTION

1. Field of the Invention

The present invention relates to liquid level gauges, and more particularly to a reflective-type gasoline level indicator such as is commonly used on power lawn mowers and the like.

2. Description of the Prior Art

Heretofore there have been a number of liquid level gauges of the general type here involved, for use on power lawn mowers, storage batteries, and other devices. Said indicators utilize a transparent depending member or blade having a plurality of prismatic facets formed in a longitudinal edge thereof and, like the present invention, which are so designed that light passing through the facet element located immediately above the surface of the liquid is reflected upwardly to give a visual indication of the liquid volume in the tank or container. Unlike the present invention, however, said prior gauge devices all utilize a flat, straight transparent blade member, and only a relatively few facet elements can be formed in the longitudinal edge of said flat blade, with the result that the indication of liquid in the tank is relatively imprecise.

With the above in mind, a principal object of the present invention is to provide an improved liquid level indicator of the type described featuring a novel spiral blade design which makes it possible to provide a much greater number of faceted light-reflecting elements on said blade, thereby providing greatly increased accuracy and precision in determining the volume of liquid present in the tank or container.

SUMMARY OF THE INVENTION

As hereinabove mentioned, the present invention provides an improved reflective-type liquid level indicator of the type commonly used as a gasoline gauge on power lawn mowers and the like. In accordance with the invention said gauge features a novel spirallike transparent depending blade having a multiplicity of faceted, prismatic elements formed in its curved longitudinal edge through which light rays are reflected upwardly and superposed on a correlated scale in the top of the unit to indicate the liquid level in the container. Due to the substantially greater surface length of the curved longitudinal edge provided by the spirallike form of the blade in the present invention it is possible to form an infinitely greater number of said facet elements thereon than can be formed in the straight, vertical blades heretofore used, thus permitting a far more exact, accurate, and reliable indication of the volume of gasoline or other liquid in the tank or container.

A further object and advantage of the present, improved reflective gauge device is that it can be formed of plastic molded in a single, unitary piece integral with the metal cap mounted in the top thereof, in contrast to prior gauges of the same general type which are formed in two or more parts, which is not only a more costly molding operation but which is more expensive to assemble.

Still further objects of the present invention are to provide a new and improved liquid level indicator, as described, which device is rugged and durable in construction, simple and reliable in use, and which is otherwise particularly well adapted for its intended purposes.

BRIEF DESCRIPTION OF THE DRAWING

In the accompanying drawing, illustrating one preferred embodiment of the present invention.

DESCRIPTION OF THE PREFERRED EMBODIMENT

Figure 1:
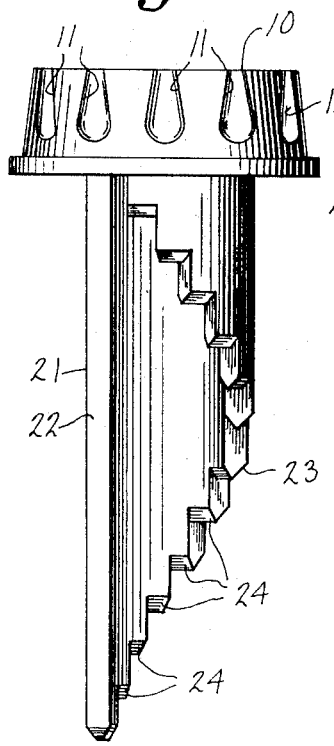
FIG. 1 is a side elevational view of the new reflective-type liquid level indicator device.

Referring now more particularly to the drawing, the numeral 10 designates the circular top portion of the new liquid level indicator comprising the present invention, said top being formed of a relatively inexpensive clear plastic material. In the illustrated embodiment of the invention said top 10 is provided with a plurality of spaced, fluted indentations 11 to facilitate the gripping and manual turning of said top, but this is not a critical feature and the invention is not to be limited in this respect.

Figure 3:
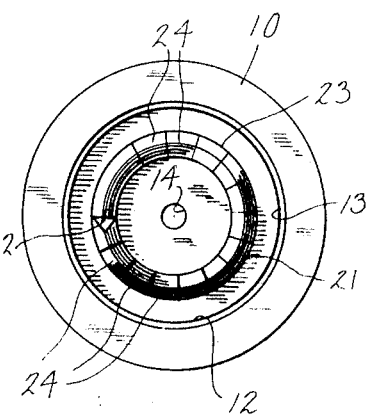
FIG. 3 is a bottom plan view.
Figure 4:
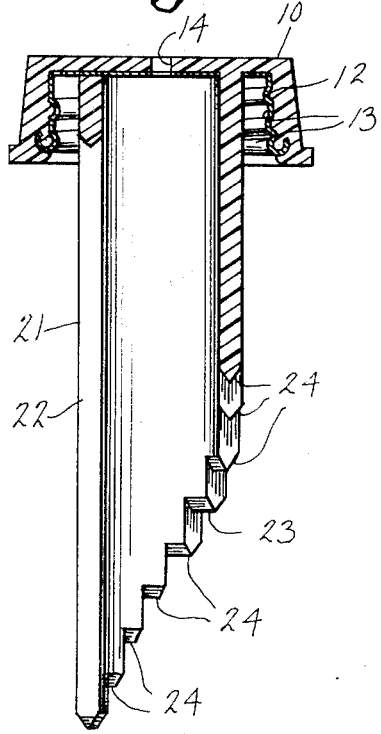
FIG. 4 is a vertical sectional view through the device.

In the preferred form of the present invention said plastic top 10 is molded directly onto and over a circular metal cap 12 (FIGS. 2, 3 and 4) having internal threading 13 (FIG. 4) which permits the unit to be securely, removably mounted on the threaded neck portion (not shown) of a conventional lawn mower gasoline tank or the like. An air vent 14 may be provided in the center of said top member, as well as in the cap 12, to prevent the accumulation of fumes or the like within the tank, as is well known in the art, and if desired foam material and a gasket or vent insert (not shown) may be installed within and immediately below said top member. Again, however, this is not a critical feature and the invention is by no means to be limited or confined in this respect.

Figure 2:
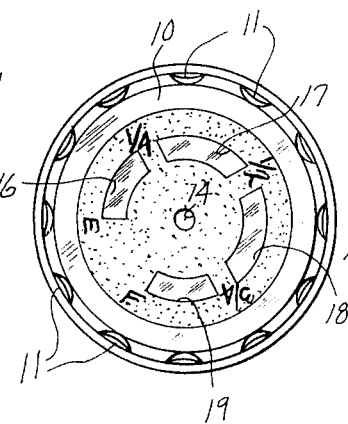
FIG. 2 is a top plan view of the device.

Said top member 10 is molded of a clear plastic material, as described, and as is shown in FIG. 2 the metal cap 12 is visible therethrough and is provided with windowlike arcuate cutouts 16, 17, 18 and 19 in its top surface with indicia "E (for empty), ¼, ½, ¾, and F (for full)" delineated thereon, said markings forming a calibrated scale designating the volume of liquid in the container, as will be hereinafter described. In the illustrated embodiment of the invention said indicia are delineated in the form of quadrants, but it is to be understood that said scale can readily include additional, more minute calibrations if desired.

In accordance with the present invention there is molded integrally with the top member 10 a downwardly extending concentric tubular portion or blade 21. Unlike conventional reflective gauges of the general type here involved, which are molded in two or more separable components that must be bonded or otherwise permanently joined during the assembly operation, said top 10 and depending tubular portion 21 in the present invention are molded as a single, integral unit. The result is not only a faster and more efficient molding operation, and a substantial cost saving in the assembly of the unit, but the resulting unit is more durable and longlasting.

As is shown in the drawing, said depending tubular blade portion 21 is of smaller diameter than the circular top 10 and projects downwardly therefrom in alignment with the aforementioned windowlike cutouts 16—19 in the metal cap insert 12. Said tubular portion 21 includes an elongated straight longitudinal edge 22, and another longitudinal edge 23 having a curved, spirallike contour, said spiralled design providing a longitudinal edge of substantially greater length than the straight, vertical edge 22.

Formed in said curved longitudinal edge 23 of the depending tube or so-called blade member 21 are a plurality of stepped, prismlike facet elements 24 each of which consists of a downwardly facing two-sided point. In the illustrated form of the invention the faces or planes of said facets are formed on a 45° angle, although the exact angular arrangement of said downwardly converging faces is not critical. Similarly, while two-sided facets have been found to perform satisfactorily, it is also possible to utilize facet elements having four or more angular faces, and the invention is not to be limited in this respect.

Figure 5:
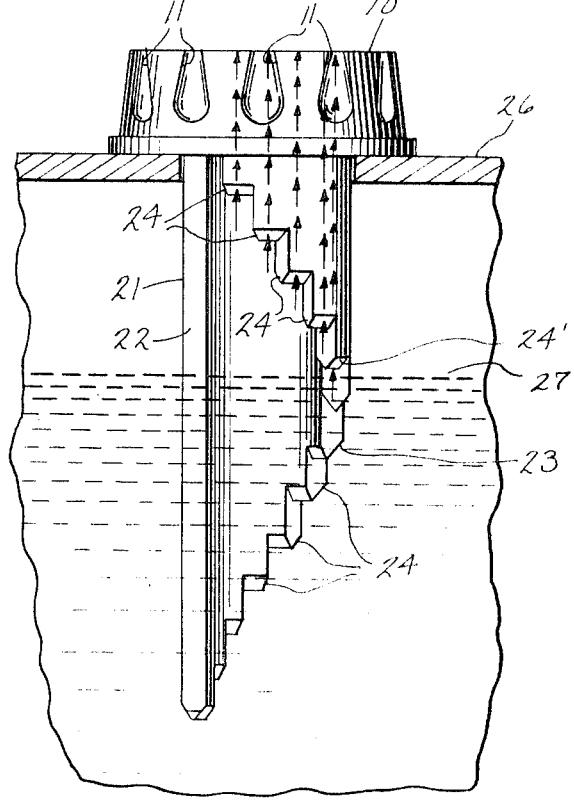
FIG. 5 an elevational view showing the improved liquid level indicator mounted in a tank and illustrating diagrammatically, the reflective light rays which give a visual indication of the liquid level in the tank.

Referring now more particularly to FIG. 5 of the drawing, when the new and improved reflective-type liquid level indicator comprising the present invention is mounted on a liquid container, such as a gasoline tank 26, a portion of the tubular blade member 21 is designed to extend below the surface 27 of the liquid. Due to the relative density of the gasoline or other liquid, and the angled nature of the facet elements 24, light is not reflected upwardly through those of said transparent facets which are immersed in the liquid. As a result, and referring again to FIG. 5, light is reflected upwardly only through the prisms or facets located above the level of said liquid, said reflected light rays being visible through the aforementioned, aligned windowlike cutouts 16—19 in the gauge top portion.

As illustrated diagrammatically in FIG. 5 of the drawing, the lowermost facet 24' immediately above the gasoline top surface 27 is the last of the facet elements on the depending blade 21 to reflect light rays upwardly, and when viewed on the calibrated scale associated with the top member 10 the reflected light from said lowermost facet 24' will give a precise visual indication of the volume of liquid remaining in the container, depending upon the location of said reflected light on the scale and its proximity to the appropriate indicia "E, ¼, ½, ¾ or F" marked on said top member.

As mentioned, the use of a generally similar-faceted transparent blade to give a reflective light indication on a calibrated scale to indicate the volume of liquid in a container is not broadly new. Heretofore, however, such devices have utilized a flat, straight blade and in a conventional reflective gauge unit of the type used on a power lawn mower there may be only five or less of said prismatic facet elements. In the present invention, on the other hand, and as is readily apparent in the drawing, the curved, spirallike design of the blade 21 permits the formation of a substantially greater number of said reflective facet elements. In the illustrated model, for example, there are thirteen facet elements formed in the curved blade edge, and even more could be readily provided if desired. The result is that with the present invention greatly increased accuracy and precision is provided in determining the volume of liquid in the tank.

As hereinabove described, the present invention is also an improvement over the reflective-type gauges heretofore used because the present unit can be molded entirely in one piece, thereby reducing manufacturing costs as well as providing a more rugged and durable unit.

It is to be understood, as mentioned, that while a preferred embodiment of the present invention has been illustrated and described herein, numerous variations or modifications therein may occur to those skilled in this art and what is intended to be covered herein is not only the form of the invention disclosed herein, but also any and all variations or modifications thereof as may come within the spirit of said invention. Moreover, while the improved reflective-type gauge comprising the present invention has been described principally for use with gasoline tanks on power lawn mowers and the like, said improved gauge can be readily adapted for an infinite number of diverse uses and the invention is by no means to be limited in this respect.

What I claim is:

1. A reflective-type liquid level gauge for a container having a threaded neck and having a quantity of liquid therein, comprising: a circular metal cap having internal threading for securing the same on the threaded neck of the container, said cap having a plurality of arcuate, windowlike cutouts therein, and said cap being provided, on its top surface, with indicia adjacent said cutouts forming a calibrated scale representing the volume of liquid in the container; a circular top formed of clear, transparent plastic molded over and around said metal cap, the indicia on said cap being visible through said transparent plastic top; a concentric tubular, transparent plastic blade member molded integrally with said plastic top and adapted to extend downwardly into the liquid in said container, said blade being aligned with the arcuate windowlike cutouts in said metal cap, and said blade having a curved, spirallike longitudinal edge; and a plurality of stepped, prismatic facet elements formed in said curved longitudinal blade edge, each of said facet elements comprising a plurality of downwardly converging angled faces, said prismatic facet elements being adapted to reflect light upwardly and superpose the same on the scale on the cap thereabove, said facet elements being so designed that light is not reflected upwardly through the facet elements on that portion of the blade immersed in the liquid, whereby light reflected upwardly through the lowermost facet element located immediately above the surface of the liquid will give a precise visual indication on said scale of the volume of liquid in the container.

2. In combination with a container having a quantity of liquid therein, and having an externally threaded neck, a reflective-type liquid level gauge, comprising: a top unit including a metal cap having arcuate cutout portions in its top surface and having internal threading for securing said top unit on the container neck, and including a plastic top member molded on and around said metal cap unit; an arcuate, calibrated scale associated with said top unit cutout portions correlated to visually represent the volume of liquid in the container; a concentric transparent plastic blade member extending downwardly from said top unit into the liquid in the container, said blade being circular in cross section, and said blade having a curved, spirallike longitudinal edge; and a plurality of prismatic facet elements formed in said curved blade edge, each of said facet elements comprising a plurality of downwardly converging angled faces, said prismatic facet elements being adapted to reflect light upwardly to be viewed on said calibrated scale thereabove, said facet elements being so designed that light is not reflected upwardly through the facet elements on that portion of the blade immersed in the liquid, whereby light reflected upwardly through the lowermost facet element located immediately above the surface of the liquid will give a visual representation on said scale indicating the volume of liquid in the container.

3. The reflective-type liquid level gauge recited in claim 2 wherein said plastic top member is formed of a clear transparent plastic material and wherein said metal cap is provided with indicia marked on its top surface forming said calibrated scale, said scale being visible through said plastic top member.

4. The reflective-type liquid level gauge recited in claim 3 wherein said blade is aligned with said cap cutout portion.